Patented Nov. 10, 1931

1,831,436

UNITED STATES PATENT OFFICE

CHARLES A. BLODGETT, OF SOUTH BREWER, AND HUGO H. HANSON, OF BANGOR, MAINE, ASSIGNORS TO EASTERN MANUFACTURING COMPANY, OF SOUTH BREWER, MAINE, A CORPORATION OF MASSACHUSETTS

METHOD FOR THE PREPARATION OF STRONG, BLEACHED SULPHATE PULP

No Drawing. Application filed June 3, 1926. Serial No. 113,551.

This invention relates to a method for the treatment of cellulosic fibrous materials characterized by having but slight effect upon the physical and chemical properties of the original cellulosic components and resulting in a strong fibrous pulp of high purity with respect to its more inert or alpha cellulose content and capable of forming paper manifesting an exceptional degree of color and strength.

The various processes at present employed for the preparation of wood pulp, as in the manufacture of paper and like products,—are generally distinguished by the means or reagents which they employ. Thus there are the mechanical process (in which disintegration of the wood is effected by the physical disruption of the fibers to a pulpy condition) and the chemical processes, including the sulphate, sulphite and soda processes, in which processes the raw material (usually in the form of chips) is treated with a liquor containing an alkali sulphide, or a sulphite, or caustic soda, respectively. The latter or chemical group of processes, may also be broadly distinguished from one another according to the acid or alkaline characteristic of the solution used therein. Upon this basis, the sulphite processes are fundamentally acid processes of treatment, whereas the soda and sulphate processes are caustic or alkaline.

As contrasted in terms of the relative effects upon the woods to which they may be applied, the mechanical process merely results in the physical comminution of the wood without otherwise affecting its general physical or chemical properties, whereas the chemical processes, so-called, accomplish in addition the substantial dissolution and removal of soluble materials from the wood fiber.

The acid or sulphite processes are effective for the treatment of selected classes of natural woods and produce therefrom pulps having a high degree of purity or, in terms of cellulosic content, a high percentage of alpha cellulose. But such pulps and the papers made from them, while serving admirably for the more refined and exacting purposes of paper manufacture and also for chemical conversion into cellulosic derivatives such as the esters, are not possessed of the highest degree of mechanical strength or toughness, either in the fibers per se or in sheets of paper or the like made from them, which is sometimes greatly to be desired.

The alkaline processes, on the other hand, are applicable to a wide variety of pulp woods either individually or together. Moreover, they are extremely active, especially when a free alkali is used alone as in the soda process, and if carried to an extent sufficient to effect the most complete liberation of soluble impurities (as by using concentrated solutions or by continuing the treatment for a prolonged period of time) they result in a highly purified pulp with respect to other substances but simultaneously effect the degeneration of the original cellulose content, with the consequent formation of a large amount of soda-soluble cellulosic compounds which are dissolved and lost or contaminate the ultimate pulped product.

The sulphate process may in a general way be considered as a modified or less active form of the soda process for the treatment of pulp but it is commonly applicable to a more widely diversified group of cellulose raw materials than the soda process,—for example pine, spruce, fir, hemlock, etc., either separately or together,—and consists primarily in cooking the chipped wood with a solution containing a soluble alkali plus a reduced sulphate, usually considered to be one or more of the alkali sulphides. The process may be varied in the purity of raw materials used and in the degree of treatment effected by the specific degree and duration of the procedure followed. However, it usually results in a relatively dark colored pulp which is characterized by being susceptible of formation into exceedingly strong paper but which is usually substantially or completely resistant to adequate bleaching, even though excessive amounts of bleaching agent be used and serious loss of fiber strength be tolerated.

It is accordingly an object of the present invention to provide a mode of treatment for cellulosic raw materials or pulps, capable of reducing the same to a suitable degree of comminution and substantially free from associated impurities such as coloring agents and various constituents which may inhibit or restrict the formation of paper therefrom but without physically or chemically disrupting the ultimate cellulosic fibers and alpha cellulose and without altering either in any manner to prevent or materially decrease their characteristic qualities of forming a strong and tough sheet therefrom. Other objects will appear from the following disclosure.

It is now found as a part of the invention that cellulosic fibrous materials, which have been reduced to the condition of a pulp by a caustic treatment, i. e. with alkaline reagents generally,—may be advantageously subjected to a supplementary or second treatment with certain reactive compounds of sulphur (as hereinafter more specifically defined) resulting in a cellulosic pulp especially characterized by high alpha cellulose content, high color and fiber strength, and at the same time having a marked capacity for being formed into an exceedingly strong and tough paper stock. It is further found that such treatment is applicable, for the attainment of desirable results in the finished product, to pulps made in accordance with the usual practices, but that it is more especially effective in the degree of strength of fiber and of the finished papers which may be made therefrom when such secondary treatment is conducted upon a pulp which has been first subjected to a short or incomplete reduction action by the preliminary pulping treatment.

A representative adaptation of the invention will be described with reference to its application to a cellulosic pulp prepared in the first instance by the sulphate process and subjected to the second stage of treatment, (with a reactive compound of sulphur) for the production of a strong cellulosic pulp adapted for making an exceedingly strong paper which is also characterized by possessing high color and a high alpha cellulose content.

In the sulphate process, as usually practiced, the alkaline liquors used effect an appreciable solution of the impurities and degenerated cellulosic components which may be present in the wood but they are less reactive toward the more resistant alpha cellulose components (physically and chemically) than when a caustic alkali alone is used, as in the soda process. However, in view of the subsequent or second stage of treatment herein contemplated (which may be carried out upon a pulp obtained by either the soda or sulphate process) the extent of the first or pulping stage of treatment employed may be reduced appreciably below that which is ordinarily necessary. Accordingly, for the purposes of this invention the time and degree of digestion of the original pulp are ordinarily greatly diminished.

The pulp thus obtained (with or without complete removal of the reagents used in the first stage) is subjected to a second stage of treatment which is characterized by subjecting the same to the action of a reactive compound of sulphur, preferably in an alkaline reducing solution.

By the term "reactive compound of sulphur" is comprehended a compound or compounds of sulphur in which the sulphur constituent or radical is susceptible of reaction with contaminant substances present in the cellulosic material, as manifested for example by the formation of soluble compounds therewith. Suitable compounds, falling within this definition, generically include those containing one or more atoms of sulphur which are characterized by exercising a lower valence (for example 2 or 4) in association with the molecular structure of the compound and are generally more reactive in the manner described when in the presence of an alkaline medium. The alkaline medium may be provided by the basic composition of the compound itself or by the positive addition of an alkaline reagent thereto. Obviously, a further qualification of such compounds, in order to be considered applicable for the purposes of the invention, is that they shall be soluble, and for practicable application that they shall exhibit ready solubility in water.

On the other hand, the more stable compounds of sulphur and compounds in which the sulphur component exerts a high valence, as in the sulphates for example, are generally ineffective for the purposes of this invention and are not to be included by the term "reactive compound of sulphur" as employed in the specification and claims.

A preferred and typical reactive compound of sulphur is sodium sulphide, which is intrinsically basic and which in solution provides an alkaline medium in which its desired association reaction with active derivatives of cellulose is readily effective. Again, sodium sulphite, or acid sulphite to which a soluble alkali may be added such as sodium hydroxide, is also especially adapted to the purposes and application of the invention. Other compounds of sulphur of analogous composition or having a like form of reactive sulphur in their molecular constitution may likewise be employed.

A representative procedure in the practical application of the invention to alkaline pulps will be described with specific reference to pulps made by the recommended sulphate process from woods such as the conifiers, but it is also to be understood that it may be applied to commercial pulps already prepared by any of the chemical processes for making pulp from cellulosic raw materials.

The wood is first reduced mechanically to the condition of chips. The chipped wood is then mixed with the cooking liquor which consists primarily of an aqueous solution of reduced sodium sulphate (primarily sodium sulphide) and caustic soda, preferably in the proportions of 40 parts to 60 parts respectively, and having a combined concentration of about 6%. The mass is charged into a digester which is directly or indirectly heated by steam, for example to a temperature of 325° F., indicated by the generated pressure in the batch, for several hours,—e. g. four to five hours.

At this stage (whether "raw cooked" or carried to the usual degree of digestion for the sulphate process) the pulp is relatively dark colored and the fibers are not profoundly disrupted by the pulping treatment. The bleaching of such a pulp, is extremely difficult and it is commercially impracticable if not impossible to bleach the same to a high color, or to approach pure white for example, by any of the ordinary bleaching processes. If the customary bleaching processes are conducted upon such a pulp to a sufficient degree of activity to have any appreciable effect upon the color of the pulp, the fiber is also attacked and its strength greatly reduced.

The pulp is then drained and preferably washed with water. This may be only partially carried out or to a sufficient degree to remove all of the soluble constituents of the batch, depending upon the commercial requirements and allowances which may obtain in any given case.

The pulp is then treated in any suitable container with a reactive compound of sulphur as above defined, or preferably such a compound rendered alkaline if necessary by the addition of a caustic alkali. As a specific example, an aqueous solution having a concentration of 3%, more or less, of the active components to be used such as 1½% sodium hydroxide and 1½% sodium sulphite is especially satisfactory. The mixture of pulp and reagent solution is charged into a suitable container such as a digester or boiler, in which the desired conditions may be attained. This treatment is preferably conducted at somewhat elevated temperature (e. g. 280° F.) and corresponding pressure and continued for about 2–7 hours with the specific pulp mentioned.

The quantity of solution used is advantageously in excess of the pulp treated and may amount to ten to fifteen times the weight of the pulp, thus producing a relatively fluid, easily manipulated and transferable mass. The treated pulp may then be drained, or pressed, or otherwise liberated from entrained solution and may also be washed free from soluble matter contained therein.

The pulp as thus prepared may be carried through the customary procedure for working up into paper stock or other products. For most purposes, however, it is desirable that the pulp should be bleached, and with the cellulosic material, as thus obtained by the present invention, such bleaching may be readily and effectively accomplished. The bleaching may be partially effected by the procedure described in copending application of Charles A. Blodgett, Serial No. 88,684, filed February 16, 1926, comprising briefly the steps of subjecting to a mild oxidizing bleach in restricted quantity or limited and controlled by the addition of a reducing agent, followed by a reducing bleach.

In the adaptation of such procedure to sulphate pulps of the present invention, however, it is necessary or advisable that the oxidizing treatment shall be somewhat more vigorous, and it is found that this may be satisfactorily done without damage to the fiber strength or ultimate strength of the paper produced therefrom. Accordingly, the pulp is next run into a vat or tank provided with an agitator in which the bleaching of the pulp is effected. This may be carried out in a single operation but is advantageously divided into two steps. In the first step the bleaching agent, which may be any of the oxidizing bleaches, such as a solution of bleaching powder containing for example 10% to 12% of bleach on the weight of the pulp, is added to the pulp and the mixture thoroughly agitated until the bleach is substantially exhausted. Any excess of the bleaching agent is then neutralized by the addition of a reducing agent such as sulphurous acid or a sulphite, and then thoroughly washed.

The second step is conducted with a weaker solution of the bleaching agent (4–6% of bleaching powder) the mixture being thoroughly agitated as before and finally the solution drained therefrom. The residual pulp is then treated with a sufficient quantity of a reducing agent to neutralize the free bleaching agent, if necessary, and to check further bleaching action thereof upon the pulp. The latter step may be further extended, with respect to either time or activity of the reagent, to effect an additional improvement of color, or a final bisulphite bleach may be employed (as alluded to above) instead of the oxidizing bleach described.

It is especially to be observed that the pulp thus produced whether bleached or unbleached, is well adapted for the purpose of making paper or like products and that such products are characterized by an outstanding degree of fiber strength and by manifesting extreme toughness and tearing strength in the aggregated structures so formed. The pulp is distinguished from cellulosic pulp products heretofore obtained, when bleached, by presenting the combination of extreme strength and comparatively high color, which have not heretofore been attainable simultaneously in the same product nor from the raw materials which may be employed for treatment in accordance with the present invention.

While the specific composition of the treating solution or liquor above described as containing equal quantities of sodium sulphite and caustic soda is especially effective for the purposes indicated, it is to be understood that other compounds may be employed and that other concentrations are applicable. It is also apparent that the invention is susceptible of adaptation to various cellulosic raw materials, that in such adaptations suitable modifications of the conditions and order of treatment may be resorted to accordingly and that the ultimate pulp and the products made therefrom may be directed to innumerable uses.

We claim:

1. A method for the treatment of cellulosic materials, which comprises effecting an incomplete reduction of the same to a pulp with a caustic reagent and subjecting the resulting pulp to a solution of a normal alkali sulphite and an alkali hydroxide.

2. A method for the treatment of cellulosic materials, which comprises effecting an incomplete reduction of the same to a pulp with a caustic reagent and subjecting the resulting pulp to a solution of normal sodium sulphite and sodium hydroxide.

3. A method for the treatment of cellulosic materials which comprises reducing the same to the condition of pulp, by cooking with an aqueous solution containing an alkaline sulphide, removing resulting solution from the remaining pulp, and treating the latter with an aqueous alkaline solution of a reactive compound of sulphur.

4. A method for the treatment of cellulosic materials, which comprises reducing the same to the condition of pulp by effecting incomplete cooking with an aqueous solution containing an alkaline sulphide, removing the resulting solution from the pulp and treating the latter with a reactive compound of sulphur in alkaline solution.

5. A method for the treatment of cellulosic materials which comprises reducing the same to the condition of a pulp by cooking with an aqueous solution containing an alkaline sulphide, removing the resulting solution from the pulp and treating the latter with a solution containing an alkali sulphite in alkaline solution.

6. A method for the treatment of cellulosic materials which comprises reducing the same to the condition of a pulp by cooking with an aqueous solution containing an alkaline sulphide, removing the resulting solution from the pulp, and treating the latter with a solution containing sodium sulphite and sodium hydroxide.

Signed by us at Brewer, Maine this eleventh day of May 1926.

CHARLES A. BLODGETT.
HUGO H. HANSON.

DISCLAIMER 1,831,436.—*Charles A. Blodgett, South Brewer*, and *Hugo H. Hanson*, Bangor, Maine. METHOD FOR THE PREPARATION OF STRONG BLEACHED SULPHATE PULP. Patent dated November 10, 1931. Disclaimer filed December 10, 1935, by the assignee, *Eastern Manufacturing Company*.

Hereby enter this disclaimer to that part of claims 3 and 4 in said patent which is in the following words, to wit:

"reactive compound of sulphur",—insofar as this term includes sodium sulphide.

[*Official Gazette January 14, 1936.*]